S. M. FOREMAN.
EXPANSION RING.
APPLICATION FILED AUG. 12, 1913.
1,136,000.
Patented Apr. 20, 1915.
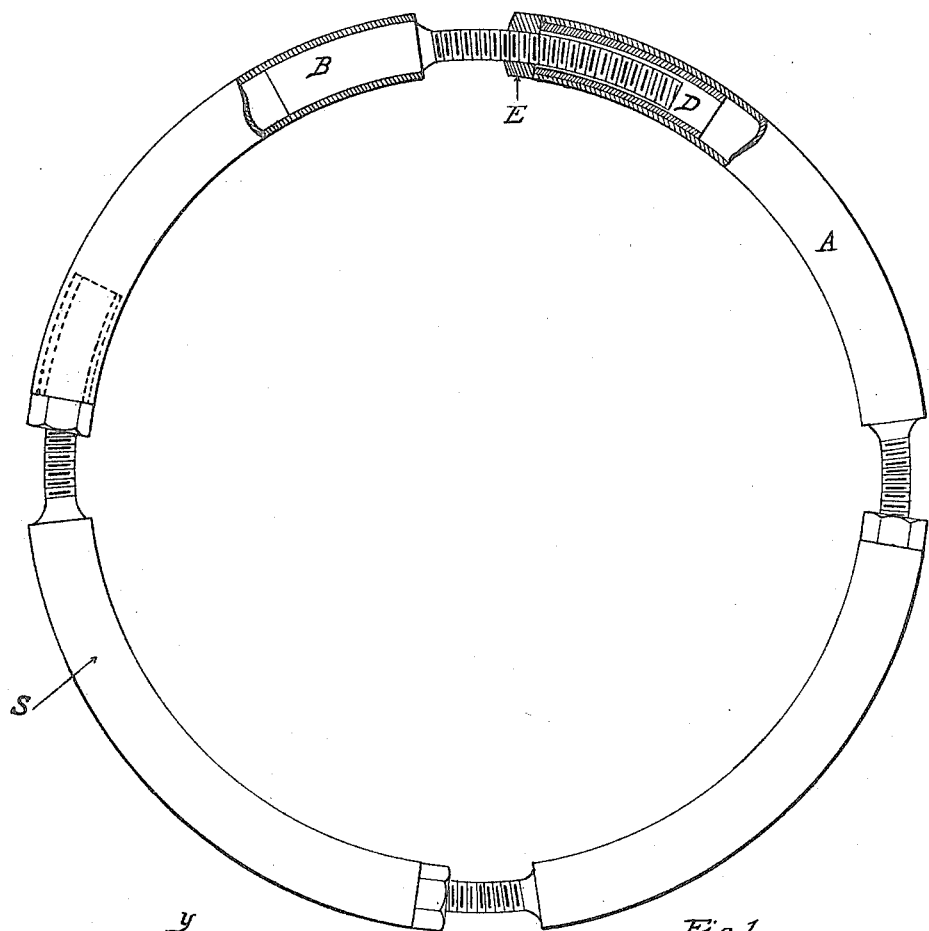
Fig. 1
Fig. 2
Fig. 3
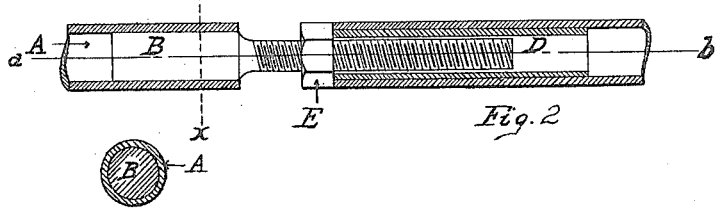
Witnesses:
John B. Vincent
Arthur S. Hull
Inventor:
Samuel M. Foreman

UNITED STATES PATENT OFFICE.

SAMUEL M. FOREMAN, OF HUTCHINSON, KANSAS.

EXPANSION-RING.

1,136,000.  Specification of Letters Patent. Patented Apr. 20, 1915.

Application filed August 12, 1913. Serial No. 784,452.

*To all whom it may concern:*

Be it known that I, SAMUEL M. FOREMAN, a citizen of the United States, residing at Hutchinson, in the county of Reno and State of Kansas, have invented a new and Improved Expansion-Ring, of which the following is a specification.

This invention is an improved expansion ring, the purpose of which is to strengthen internally cylindrical structures which are liable to considerable pressure from without, thereby tending to prevent the collapse of such structures.

While my device is designed primarily for use in a wood stave silo, and is particularly described in such relation, it is obvious that it may be used in any structure where such strengthening means is desirable.

The wood stave silo of ordinary construction consists of a suitable number of cylindrically arranged vertical staves held in position by the external application of bands which are adjustable in length or circumference. With the seasoning of the staves and their alternate expansion from the moisture of the silage and contraction after its removal, the bands in time become loose, and the whole structure becomes insecure. Without frequent attention to tightening the bands on such a silo when it is empty or nearly so, it is in danger of collapse, especially in a region where high winds are common, and frequent losses occur from such collapsing.

With one or more of my expansion rings properly placed within a silo as it is being emptied, collapsing from any ordinary cause is prevented.

In the drawings illustrating my invention, Figure 1 is a plan view of the complete device, parts being broken away on line *a—b* of Fig. 2 to show its interior features. Fig. 2 represents a fragmentary vertical section taken circumferentially through the adjacent ends of two segments, the rod and nut being shown in elevation. Fig. 3 represents a cross section on line *x—y* of Fig. 2.

As shown, the device is made up of a number of segments having such curvature that when combined with one another, and with the nuts all in their operative relation, they form a ring which is substantially circular. As shown in Fig. 1, the diameter of the ring is greatly reduced in proportion to sizes of the various parts. As these segments are identical in form for all rings of the same size and of the same number of segments, the full description of one of them suffices for all. The segment S comprises a tubular portion A and a rod B. One end portion of the rod B is of such diameter that when inserted into the end of the tubular portion as shown, it fits tightly therein. This joint is made secure by brazing. The remaining portion of the rod is reduced in diameter and screw threaded to receive the nut E. At the open end of the tubular portion, its tubular bore is reduced for a short distance by the insertion of a piece of smaller tubing D, the two tubes being in the present construction brazed together. The nut E threaded to engage the threads of the rod, operates as hereinafter noted.

In use, segments are selected suitable to form a ring of the size desired. The nuts are screwed onto the rods to near the limit of the threads thereon. The segments are then arranged in consecutive order, the rod of each inserted into the open end of the tubular portion of an adjacent segment. The ring is placed in position and the nuts backed against the contiguous ends of the tubular portions A until the required amount of expansion is obtained.

It will be understood that in an actual embodiment of the invention the diameter of the ring will be such that there will only be a slight amount of curvature in the threaded portions and therefore a thin nut such as is indicated at E will readily fit and turn thereon.

The reducing member D forms a bearing through which the rod slides snugly, the rod being thereby held centrally within the tubular portion A.

Numerous advantages in the construction of this ring will appear to one acquainted with the art. By making the greater portion of the ring tubular, I gain in that portion a maximum of rigidity with a minimum of material. By having the ring in a plurality of segments, I am enabled to better distribute the pressure when the ring is expanded, thus tending to equalize the strains produced and diminishing the danger of opening up large cracks between the staves.

A further advantage of making the ring adjustable and in segments is that it is easily removed from the silo. As is readily understood, expansion rings are not needed in that portion of the silo which is filled; and if left therein they are soon so corroded by the acids of the silage as to be rendered much less effective or entirely useless. By my construction, the rings are conveniently inserted in the silo as the contents are removed, and as conveniently removed as the silo is filled, and stored until the next season. This greatly reduces the expense for internal supporting means for the structure.

While the form of device shown in the drawings is made up of four segments and nuts in combination therewith, it is clearly within the scope of the invention to employ a larger or smaller number of segments, as may be found advantageous in the formation of a ring, or even to form the ring of a single member with the adjusting means as disclosed.

It is also evident that other means than those stated might be employed for securing the rod and tubular portion together and for reducing the bore of the tubular portion.

I claim:

An expansion ring, for the interior of silos and the like, comprising a plurality of similar, curved, tubular sections, each section having a threaded extension secured in one end thereof and an axial opening in its opposite end adapted to receive the threaded extension on the adjoining section, and a nut on the threaded extension adapted to engage the end of the adjoining section and whereby the ring may be expanded and the sections relatively adjusted.

SAMUEL M. FOREMAN.

Witnessed by—
　JOHN B. VINCENT,
　ARTHUR S. HULL.

Copies of this patent may be obtained for five cents each, by addressing the "Commissioner of Patents, Washington, D. C."